(12) United States Patent
Zazzu et al.

(10) Patent No.: US 8,360,317 B2
(45) Date of Patent: Jan. 29, 2013

(54) APPARATUS AND METHOD FOR ENHANCING CARD SECURITY

(76) Inventors: Victor Zazzu, Belle Mead, NJ (US); Wenyu Han, Princeton, NJ (US)

(*) Notice: Subject to any disclaimer, the term of this patent is extended or adjusted under 35 U.S.C. 154(b) by 220 days.

(21) Appl. No.: 12/803,164

(22) Filed: Jun. 21, 2010

(65) Prior Publication Data

US 2011/0309146 A1    Dec. 22, 2011

(51) Int. Cl.
*G06K 7/00* (2006.01)
(52) U.S. Cl. ........................ 235/440; 235/488
(58) Field of Classification Search ................ 235/440, 235/488, 492, 486, 487
See application file for complete search history.

(56) References Cited

U.S. PATENT DOCUMENTS

| | | | |
|---|---|---|---|
| 6,697,179 B2 * | 2/2004 | Hsiao | 359/2 |
| 2004/0118930 A1 * | 6/2004 | Berardi et al. | 235/492 |
| 2005/0040242 A1 * | 2/2005 | Beenau et al. | 235/492 |
| 2008/0203172 A1 * | 8/2008 | Berardi et al. | 235/492 |
| 2009/0103150 A1 * | 4/2009 | Heierli et al. | 359/2 |
| 2010/0264227 A1 * | 10/2010 | Joyce | 235/493 |

* cited by examiner

*Primary Examiner* — Thien M Le
(74) *Attorney, Agent, or Firm* — Henry I. Schanzer, Esq

(57) ABSTRACT

A card adapted to be read by a machine has certain patterns and physical characteristics unique to the card and includes electronic circuitry for storing selected of these characteristics. The machine includes apparatus for; (a) optically sensing selected characteristics of the card; (b) electromagnetically sensing information stored in the card; and (c) comparing optically sensed data with electromagnetically sensed data for validating the card. The machine further includes apparatus for selectively processing and updating the information stored on the card each time it reads the card.

23 Claims, 13 Drawing Sheets

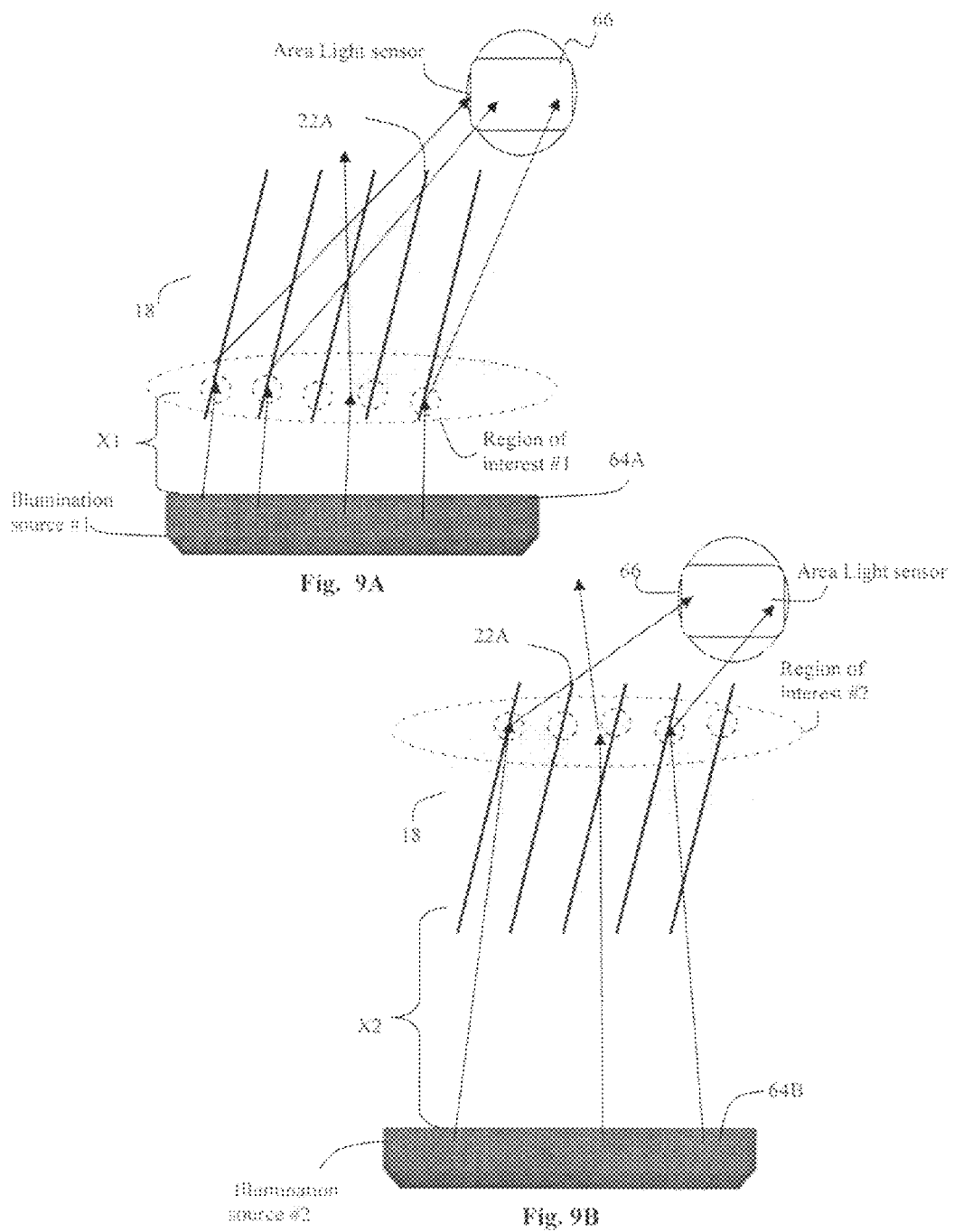

APPARATUS AND METHOD FOR ENHANCING CARD SECURITY

BACKGROUND OF THE INVENTION

This invention relates to valuable cards, instruments and documents and, in particular to methods and apparatus for patterning or encoding these cards, instruments and documents.

For ease of discussion, the invention will be illustrated using cards such as commonly used plastic cards. However, it should be understood that the term "cards", as used in the specification to follow and in the appended claims, includes instruments, labels, tags, and documents (e.g., passports) of all types, although not specifically identified as such.

Cards of interest may be used, for example, to identify a person or object and/or they may be used as a value card (i.e. a debit card or credit card) to withdraw money from a machine. Because of the value of these cards there are counterfeiters who make "false" cards which attempt to imitate "true" or "valid" cards. To enhance the security of the cards it is known to add additional security features to the surface of the cards. These added security features can take the form of holograms or spatially dependent optical images or ghost images strategically placed on the surface of the card.

In certain applications, the security features depend on a person actually checking that the cards' security features are present and/or intact. This is problematic since most persons responsible for checking the validity of the card, such as a cashier, do not actually look at the card and simply mechanically swipe the card through a card reader, such as a slot reader. When this occurs, the security features present on the card such as the hologram on the surface of the card and the signature on the back of the card are rendered useless.

It is therefore desirable and necessary to develop a more reliable and automatic means for impeding the falsification of a card by using card readers to check the validity of the cards. Thus, card readers, rather than humans, may be used to automatically read or sense the security related information contained on a card to identify whether a card is valid. Also, to increase the security of the cards more features may be added to make it more difficult to counterfeit these cards. Examples of means for enhancing the security of cards and for sensing (reading) the presence of the enhanced security means are described in Applicants' issued patents, identified below, the teachings of which are incorporated herein by reference: (a) Multi Sensor Information Reader, U.S. Pat. No. 6,616,043; (b) Method and Apparatus For Impeding The Counterfeiting Of Cards, Instruments and Documents, U.S. Pat. No. 6,068,301; and (c) Card With Enhanced Security Features, U.S. Pat. No. 7,407,101.

Although cards and card reader systems made in accordance with our previous inventions have significant advantages, there are instances when even greater or different types of secured cards and card reader systems are desirable.

Thus, it is desirable to have cards designed such that it is almost impossible to counterfeit the cards. It is also desirable to have cards designed with features that make it virtually impossible to extract information from the cards when an associated reader can not validate stored information or when the cards do not satisfy some predetermined criteria.

SUMMARY OF THE INVENTION

In accordance with one aspect of the invention, cards (instruments) embodying the invention include a programmable data storage and processing element (also referred to herein as a "data processor") which can be selectively modified or updated in accordance with preselected criteria in addition to, and/or independently of, any fixed data associated with the identification of the card. By way of example, the cards' element may be modified or updated each time the card is read. By way of further example, where the card/instrument is a passport the updated information may be used to track certain usage of the passport holder.

Typically, data present on, or within, a card can be read by an associated card reader and then stored in the card's data storage and processing element for subsequent comparison check by an associated reader. When the associated reader makes a comparison of previously read data with newly read data and the comparison meets a predetermined criteria the use of the card is validated and the card can be used for its intended function. In accordance with the invention, the card's data processing element enables newly read data to be coded and stored in the element. The operation of the element is dynamic in that the data processing element can be modified each time the card is read. A card with this feature can provide increased security and versatility.

In accordance with another aspect of the invention, cards may be formed with a random pattern which ensures that each card is unique, to a high degree of probability. The random/unique pattern may be sensed optically and corresponding data sets may be generated and then stored in a data processor contained within the card and/or in an external database.

Cards embodying the invention may include a substrate layer on which is formed an intermediate layer which includes a fixed geometric pattern. Overlying the intermediate layer is a patterned layer containing a holographic geometric pattern formed independently of the fixed geometric pattern. The resultant pattern formed by the combined fixed and holographic geometric patterns is different (random) for each card that is made and can only be read at a predetermined angle. A degree of security results in that to read at the desired angle requires a reader which is "mated" to the cards.

The resultant pattern is nearly impossible to replicate because it varies randomly with every individual card. Further, the resultant pattern is not likely to be duplicated during the manufacturing of the cards as the total index or repeat of the holographic pattern is a non-integer multiple of the step and repeat of the long dimension of the cards.

In accordance with one aspect of the invention, a holographic geometric pattern overlies a fixed geometric pattern producing cross over points. The cross over points of the holographic pattern with a selected part (e.g., line segment) of the fixed geometric pattern can be optically read to generate one or more data sets. The data sets can be stored by a data processor which may be programmed to encrypt and store the data sets to provide additional security features. The geometric pattern may be used to form the keys (seed) that feed a typical encryption algorithm (e.g., such as the commonly known DES or RSA encryption code).

Still another aspect of the invention is directed to a method of forming a card by combining two subassemblies. The first subassembly includes a substrate, and an intermediate layer overlying the substrate with a pseudo-fixed geometric pattern formed on, or within, the intermediate layer. Note that different cards may actually have different fixed geometric patterns. The second subassembly includes a protective layer having an outer surface and an inner surface with a holographic pattern formed on the inner surface of the protective layer, independently of, and unrelated to, the fixed geometric pattern. The first and second sub-assemblies are then combined such that the inner surface of the protective layer is in contact with the intermediate layer. The outer surface of the protective layer defines one outer, external, surface of the card and the substrate defines an opposite outer, external, surface of the card. The holographic geometric pattern layer overlies the fixed geometric pattern layer such that the resultant pattern produced by the combination of the holographic pattern and the pseudo-fixed geometric pattern produces a random pattern (i.e., different for each card, whereby each card is essentially unique with a random pattern).

In accordance with a system aspect of the invention, a card embodying the invention, may be read by an associated ("mated") reader designed to optically sense the "random" pattern formed at the points at which a holographic geometric pattern crosses over selected regions of the fixed geometric pattern and to generate corresponding data sets which are stored in a data processor and/or which are subsequently compared with the data stored in the data processor. The data may be encrypted to provide additional security features.

A still further aspect of the invention includes the defining, selection and use of different regions of a card embodying the invention as "regions of interest" to increase the security of the card. In the specification to follow and in the accompanying claims, a region of interest is defined as a selected portion of a fixed geometric pattern which is optically sensed relative to the overlying holographic geometric pattern to determine the nature of the random pattern within that region/portion. Applicants recognized that more than one region of interest may be designated on a card and that different random patterns corresponding to the designated regions of interest can be read and stored in the card's data processor and subsequently used in many different modes to further increase the security of each card. Thus, a reader "mated" with the cards may be programmed to optically sense the resultant random patterns and process the data to validate the cards.

As noted, selected regions of interest on a card may be optically sensed to produce various data sets indicative of selected attributes of the card which can be stored in a data processor located within the card. The card can be validated by subsequently optically sensing the selected regions and comparing the sensed patterns with the stored data sets. For security purposes and to avoid counterfeiting of the card, the information stored on the data processor can be modified each time the card is validated.

A still further aspect of the invention includes a reader which can "mate" with cards embodying the invention. The reader includes an illumination source for illuminating the card at a prescribed angle and a sensor for sensing the light at a corresponding angle.

In one embodiment the reader will sense if the card is fully inserted. The reader can optically scan the card to sense selected physical characteristics and to also detect data stored in the card's data processor. The reader can process the scanned and stored data and determine whether there is a match. If yes, the reader can then read any additional stored data. Finally, the reader can calculate new optical scan locations and number of read cycles and re-write that information to the card's data processor/memory.

As already noted, the "random" optical data pertaining to each card is fixed and is set as to any particular card. But, the resultant optical pattern and its corresponding data can (and does) vary from card to card. In accordance with the invention, the reader includes means to optically read the random pattern fixedly located on the card and also includes programmable data processing means to process fixed data, including encrypting data and data obtained from different regions of interest. The reader may also include means for updating processed data as a function of preselected criteria, such as, for example, the number of times the card is read. This essentially produces new or additional variable data which, in accordance with the invention, may be stored in the card's data processor and/or in the reader.

BRIEF DESCRIPTION OF THE DRAWINGS

In the accompanying drawings, which are not drawn to scale, like reference characters denote like components.

FIGS. 9A, 9B, 9C, and 9D are examples showing the use of illumination sources and light sensors to sense information along certain regions of interest;

DETAILED DESCRIPTION OF THE INVENTION

FIGS. 1A, 1B, 1C and 2 illustrate features of a card 10 embodying the invention and a method for forming such a card 10.

A card 10 (which may be an instrument, label, tag, or any type of document) typically includes multiple layers of plastic (or other suitable materials) which are intended to improve the life of the card. The card when subjected to repeated use and to a variety of different temperatures and pressures can develop multiple scratches along the surface. To protect the card's surface from being scratched it is standard practice to add a clear protective layer 24 of plastic material over the top surface of the card. In accordance with one embodiment of this invention, the clear protective layer can be utilized to form a security element useful in deterring possible attempts to counterfeit the card.

Figure 1A:
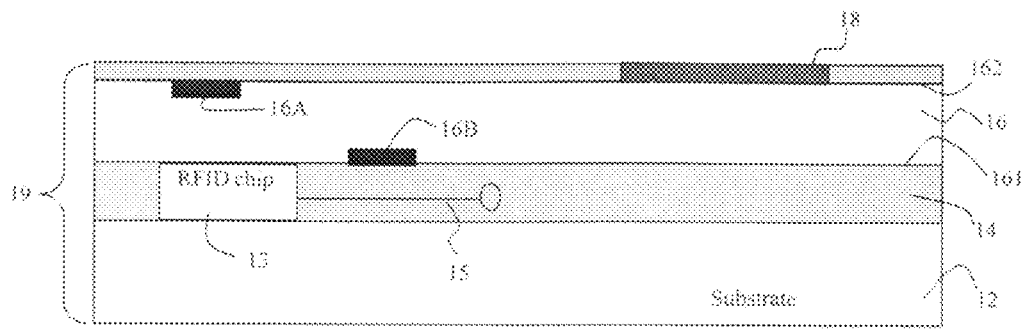
FIG. 1A is a cross sectional diagram of a first subassembly for forming part of a card embodying the invention.
Figure 1B:
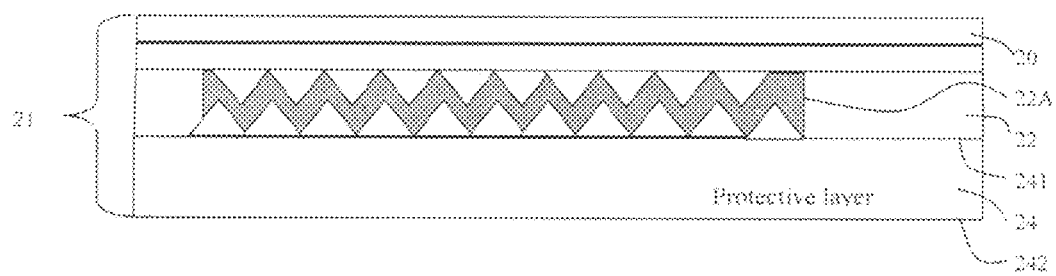
FIG. 1B is a cross sectional diagram of a second subassembly for forming part of a card embodying the invention.
Figure 1C:
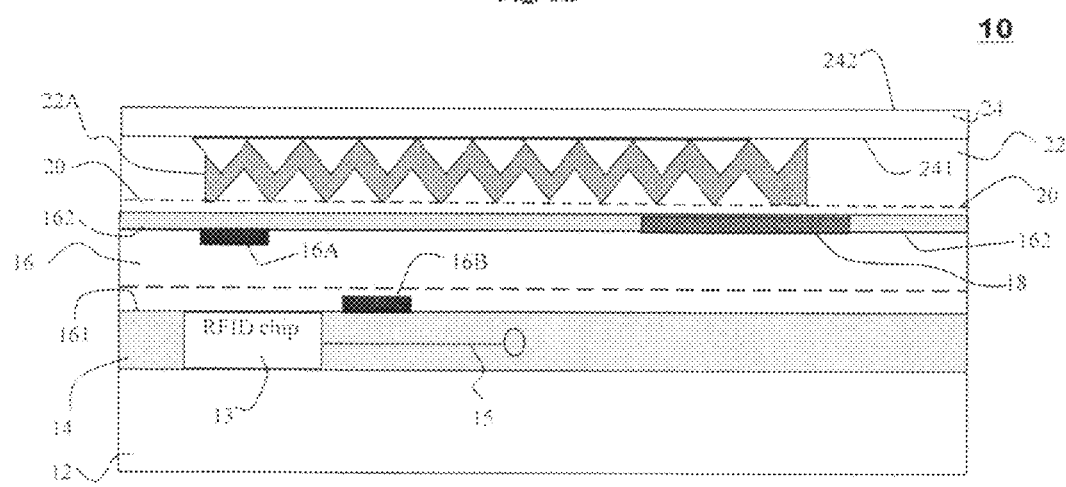
FIG. 1C is a cross sectional diagram of the first and second sub-assemblies combined to form a card embodying the invention.

FIG. 1A is a cross-sectional view illustrating the formation of a subassembly 19 of a card 10 (see FIG. 1C). Subassembly 19 includes a substrate layer 12 which may be made from polycarbonate, PVC, PET, or any other suitable material. In FIG. 1A there is shown a layer 14 formed over layer 12, a layer 16 formed over layer 14, and a hologram 18 located over layer 16. Layers 12, 14, and 16 together with hologram 18 define subassembly 19.

Layer 14, which overlies layer 12, is shown to include a radio frequency ID (RFID) chip 13 and an associated antenna 15 embedded therein. Cards embodying the invention may include RFID related apparatus. Most RFID chips include an integrated circuit ("chip"), e.g., 13, for storing and processing information and for modulating and demodulating a radio-frequency (RF) signal, and other specialized functions. The antenna (e.g., 15) is coupled to the chip and is suitable for receiving and transmitting signals. As detailed below, cards made according to the invention include, additional, novel circuitry which can be programmed to provide enhanced security and utility features. Layer 14 may be made from PVC, PET, or any other suitable material. Layer 16 has a bottom surface 161 overlying layer 14 and an upper surface 162. Layer 16 may be clear or opaque and may be formed from polycarbonate, PVC, PET, or any other suitable materials.

A hologram 18 may be formed along, or within, the top surface 162 of layer 16. The hologram 18 may be termed a security hologram because it provides protection against the easy copying of the card. The pattern of the security hologram is fixed and the location of the security hologram 18 is also generally fixed and well defined. Hologram 18 exemplifies a fixed geometric shape located within or above layer 16 positioned in generally the same location for all cards made by, or for, a given entity.

Additional fixed geometric shapes, e.g. 16A, 16B, may be located, or formed, within, or above, layer 16, as shown in FIGS. 1A and 1C. The fixed geometric shapes 16A, 16B can be made of reflective or non-reflective material; and may include an identifying photo, e.g. 31 (see FIG. 2), graphic, or other information.

Figure 5:
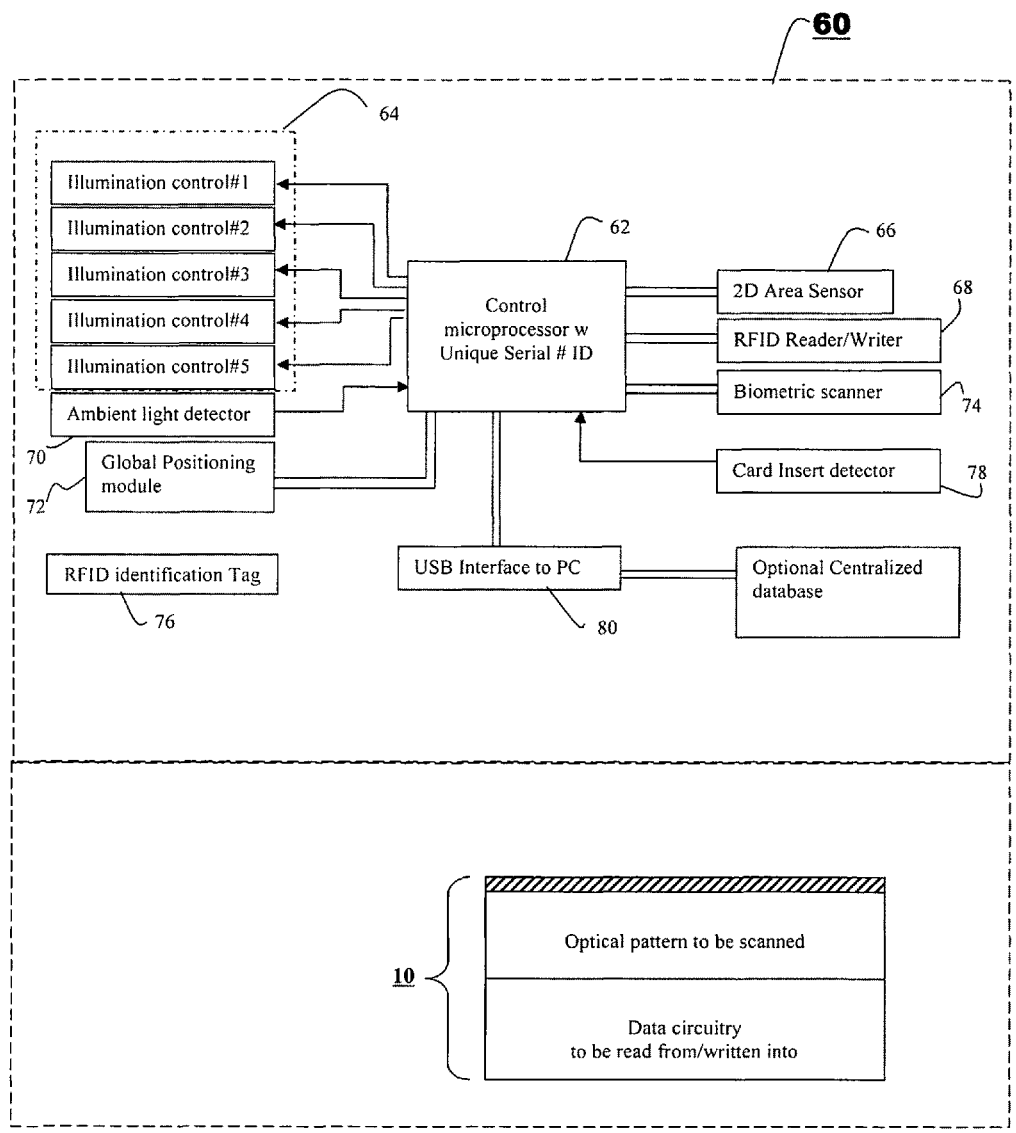
FIG. 5 is a block diagram of parts of a reader system including illumination sources and sensors suitable for practicing the invention.

FIG. 1B illustrates the formation of a subassembly 21 which includes a clear protective layer 24 over which is formed a patterned layer 22 over which is formed an adhesive layer 20. Layer 24 is intended to eventually protect the card 10 from scratches or other harmful effects (as shown in FIG. 1C). The clear protective layer 24 has an "outer" surface 242, shown as the bottom of layer 24 in FIG. 1B, and an "inner" surface 241 shown at the top of layer 24 in FIG. 1B. Layer 24 can be constructed from a see-through material and functions as the carrier for the formation of a holographic geometric pattern 22A, as discussed below. The see-through layer 24 may be metalized on the back ("inner") side (surface) 241 with an extremely thin layer 22 of any material having a high reflective index (HRI) such as Zinc Sulfide, to enable the formation of holographic geometric pattern 22A. The optical properties of the material used to form the holographic layer 22 are such that they will allow light impinging on the surface 242 at a pre-determined angle (alpha) to be reflected off at a pre-determined angle (beta), as shown in FIG. 5.

Thus, holographic pattern 22A is embossed on, or within, the pattern layer 22 and 22A may be a holographic pattern having any desired geometric shape. Pattern 22A may be a randomly formed pattern. Alternatively, pattern 22A may be a repetitive pattern which may be combined randomly and/or differently with respect to the "fixed" pattern formed in subassembly 19. Pattern 22A is formed independently of and in an unrelated manner to the security hologram 18 and any other fixed geometric shapes, e.g. 16A, 16B shown in FIG. 1A. In practice, an adhesive layer 20 may be deposited on pattern layer 22 after the pattern 22A is formed to finalize subassembly 21. Subassembly 21 may then be combined with subassembly 19 whereby the pattern 22A of layer 20 overlies the fixed geometrical sites present in subassembly 19. This forms the resulting card 10 as shown in FIG. 1C.

When viewing the card 10 from the top side, the resultant optical pattern produced (and seen) by combining pattern 22A with the security hologram (e.g., 18) or any other fixed geometric shapes (e.g., 16A, 16B) is a truly random pattern. Consequently, the resultant pattern of each card, as formed, will be unique to a high degree of probability, due to the way the subassemblies 19 and 21 are formed and combined.

FIG. 1C shows the combination of the first, 19, and second, 21, subassemblies to form the card 10 with a resultant random optical pattern as discussed above. To protect the card surface a see-through protective layer (e.g., 24) is formed over the hologram. The see-through protective layer includes a "holographic" pattern 22A formed on the inner surface of protective layer 24, as discussed above, which overlies the "fixed" information sites. The pattern 22A may be designed to have any desirable (repetitive or non-repetitive) geometric pattern. As noted above, pattern 22A is formed independently of the fixed information sites whereby the cross overs of the lines of pattern 22A with the fixed information sites produces a random and perforce, a generally unique, pattern. The protective clear lamination layer 24 may range from a completely transparent polyester film to an embossed thin film with some optical reflective properties (e.g. a see-through hologram). By carefully designing the artwork that is located on the protective film to form holographic pattern 22A and by controlling the angle of the reflective properties it is possible to utilize these parameters in such a manner as to develop a system in which the scanned optical properties can become a unique security feature of the card.

In addition to the above, the card 10 may contain security features including, but not limited to, encryption, the use of biometrics, nano-text, up-converting inks, down-converting inks, other magnetic and RF "taggants", and a hologram.

In accordance with the invention, a reader/writer system is designed to enable the RFID card to be encrypted and its contents to be read in a security enhanced manner. The reader includes; a source, or sources, of illumination located at pre-determined angles (alpha) with respect to the card surface and receiving light sensor(s) located at set angles (beta) with respect to the card's surface to capture the reflected optical pattern.

Figure 2:
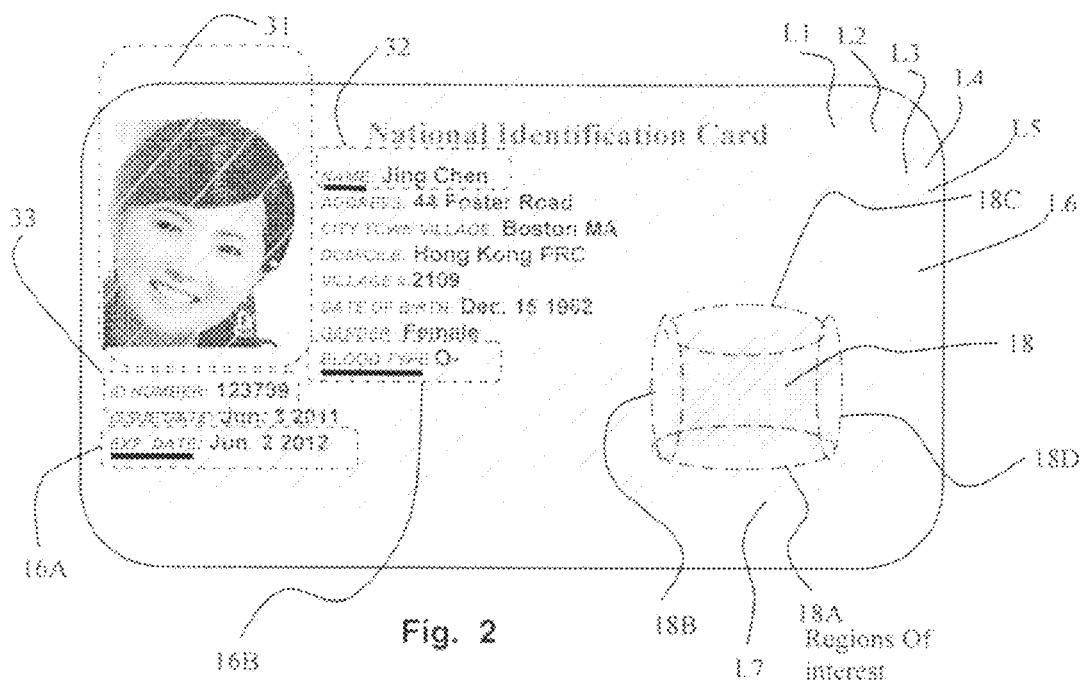
FIG. 2 is a top view of a card embodying the invention highlighting areas designated as regions of interest.

FIG. 2 shows an example of a card 10, designed as a national ID card, containing selected informational sites relating to a person such as: a photo 31, name 32, and ID number 33 of the cardholder. These sites are by way of example and other information sites may be used (e.g. address, date of birth, or issue date). Additionally, the card may include a security hologram, 18, similar to those generally found on a credit card. The card may also include other designated sites such as 16A, 16B. These information sites are generally similarly configured and in the same general locations on all cards manufactured by or for the same entity. For ease of discussion these information sites are referred to as "fixed" information sites.

Figure 3A:
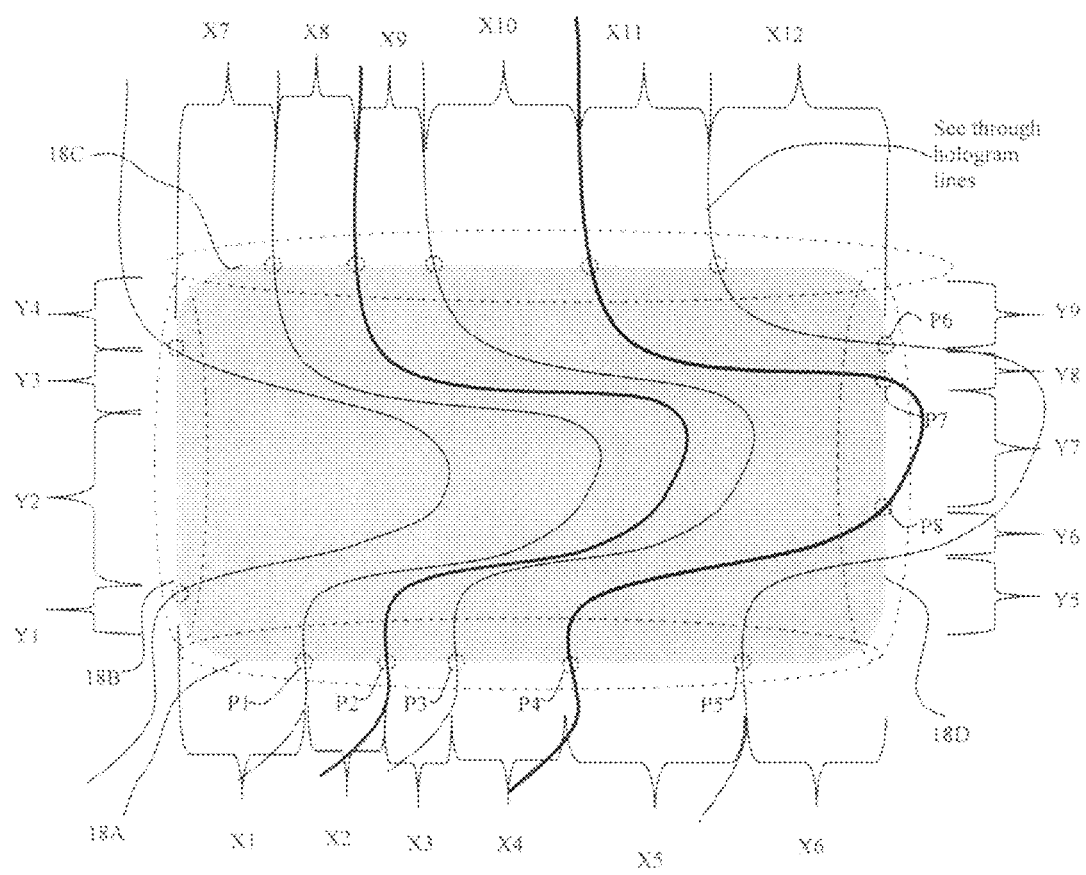
FIG. 3A is a top expanded view of a holographic pattern overlying a fixed geometric pattern.

The holographic pattern 22A overlying the fixed information sites may be designed to have any type of geometric line or shape. In FIGS. 2, 3B, 3C, and 3D; the pattern 22A is shown to be a set of diagonal lines. In FIGS. 3A and 4, the pattern 22A is shown to be a set of curved lines. In the examples given here the lines forming holographic pattern 22A are designed such that there is a non-uniform spacing between the lines.

However, the invention may be practiced with uniform line spacing if the total index or repeat of the holographic pattern 22A is a non-integer multiple of the long dimension of the card. As a result of these conditions, the number of lines of pattern 22A crossing any predetermined line segment the card will vary from card to card and be virtually impossible to duplicate. For example, one card will have 6 lines of pattern 22A passing across the lower line segment (18A) of security hologram 18. On another card it may be 5 lines and on another it may be 4. The number of detection points per selected line segment will be unique to each card. In addition, another unique factor is the recognition that it is possible to detect the relative distance along a selected line segment (e.g., 18A) from a selected edge (e.g., the left or right vertical edge) of the security hologram 18 to the first cross over with a line from pattern 22A. This measurement can be done with extreme accuracy and when combined with the number of crossings along the line segment it is nearly impossible to duplicate this exact physical construction.

During the construction phase of the cards there are no precise placements of the relative security material and the steps are performed independently of each other and they may not even be done in the same facility. In fact, the less precise the placement of the security material the more secure the card will be.

Sensing and storing the optical information and enhanced security system.

After the cards have been constructed then the physical information is scanned via selected optical detectors and then, and only then, is the information associated with the resultant pattern saved (stored) on the RFID card's secure memory area and from that information encryption keys are generated for the RFID to further increase the security of the card.

One aspect of the invention, to be discussed below, is the selection of "regions of interest". Referring to FIG. 2, note that any line segment (edge) which provides a contrast can be selected to be a region of interest. Selecting multiple regions of interest increases security because a counterfeiter cannot know which region of interest is to be used and the sequence in which they are used. The lines (or elements) of pattern 22A which overlies fixed geometric shapes can be used to generate data points. The lines of pattern 22A are designed to have a non-uniform (non-repetitive) spacing, although that is not necessary to practice the invention. In either event, the total index or repeat of the lines of pattern 22A is a non-integer multiple of the long dimension of card 10. Consequently, pattern 22A will vary randomly with respect to the individual cards and their fixed information sites. Therefore, the resultant pattern produced by combining pattern 22A with fixed information sites produces data points which are dependent on the particular pattern of an individual card. Sets of data points can then be generated specific to individual cards and locations on the card.

Cards embodying the invention include fixed geometric shapes over which a variable pattern 22A is formed. The line segments (18A, 18B, 18C, 18D) corresponding to the top bottom and side edges of security hologram 18 and line segments 16A, 16B are examples of fixed geometric shapes. The lines 16A and 16B are located at determined locations on card 10. It should be noted that lines 16A and 16B may be located anywhere on card 10 and not necessarily in proximity to identifying information.

Selected fixed geometric sites or regions (e.g. line segments 18A, 18B, 18C, 18D of security hologram 18 and line segments 16A, 16B) can be defined as regions of interest. The regions of interest will be used to generate data points. For example, security hologram 18 has four edges (18A, 18B, 18C, and 18D) and each edge may define a region of interest.

The elements of pattern 22A (e.g., lines L1-L6), which vary from card to card, overlie (or cross over) the fixed geometric shapes of their corresponding card at different points within a region of interest (see FIGS. 2, 3A-3D, and 4). The points at which the elements of pattern 22A overlie selected geometric shapes within a region of interest define specific data points which can be used to validate the card. It is anticipated that the resultant pattern produced by the combination of pattern 22A with any fixed underlying geometric shape(s) will be different for every card produced and will be virtually impossible to replicate.

FIG. 3A shows an interference pattern which would be seen/observed by a reader looking down at the card 10 at a prescribed angle. Referring to FIG. 3A and focusing first on horizontal edge 18A, which defines a region interest, it can be observed that elements (e.g., lines L1-L6) of pattern 22A cross edge 18A at points P1, P2, P3, P4, and P5. These points form a set of data which may include, but is not limited to, information such as: the number of points, e.g. five; the distances X2, X3, X4, and X5 between succeeding points; the distance X1 between the left most edge 18B of the region of interest and a first point P1; and the distance X6 between point P5 and the right most edge 18D of the region of interest.

In FIG. 3A it is shown that the elements of pattern 22A also cross edges 18B, 18C, and 18D, each of which define other, different, regions of interest. By way of example, the elements of pattern 22A cross vertical edge 18D at three intersecting points, P6, P7, and P8 (compared to five points along edge 18A). Further, various distances Y5, Y6, Y7, Y8, and Y9 can be measured between the intersecting points and the edges of fixed element 18. The number of intersections points and the distances will be different for each side. Therefore, since the holographic pattern 22A varies randomly relative to the underlying fixed geometric shapes within card 10, different data sets will be produced for the different edges. That is, the data obtained for the resultant pattern at region 18A will be different than that for region 18B, which will be different than that for region 18C which will be different than that for region 18D.

Figure 3B:
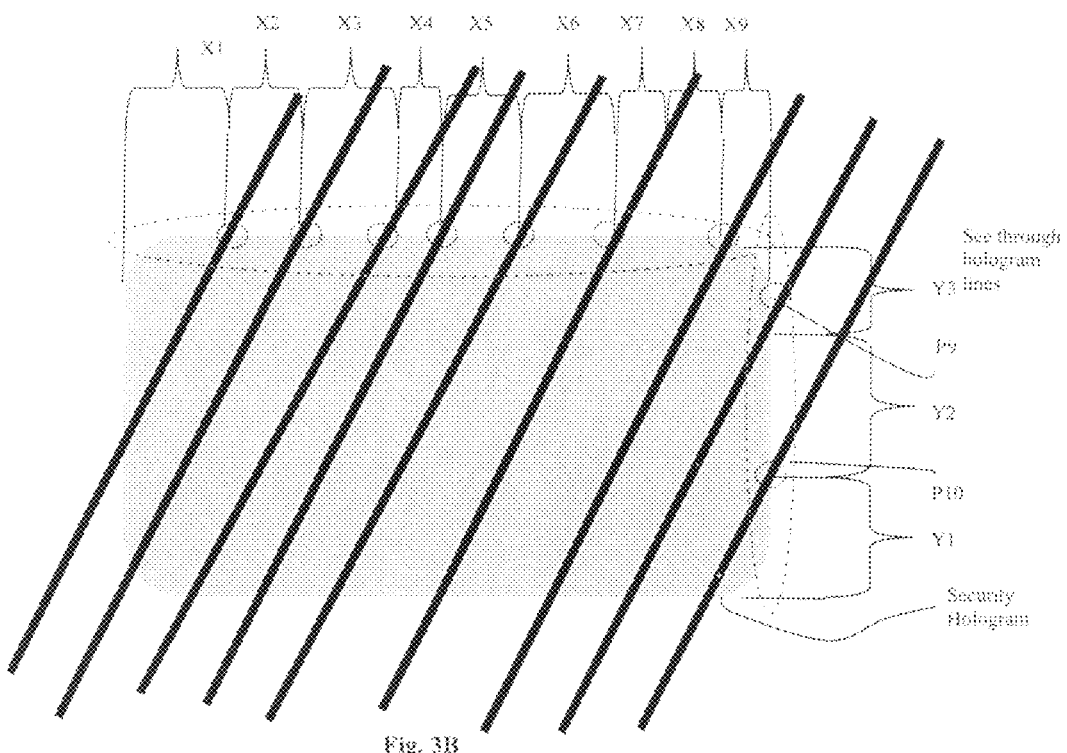
FIG. 3B is a top view of another holographic pattern overlying a fixed geometric pattern.
Figure 4:
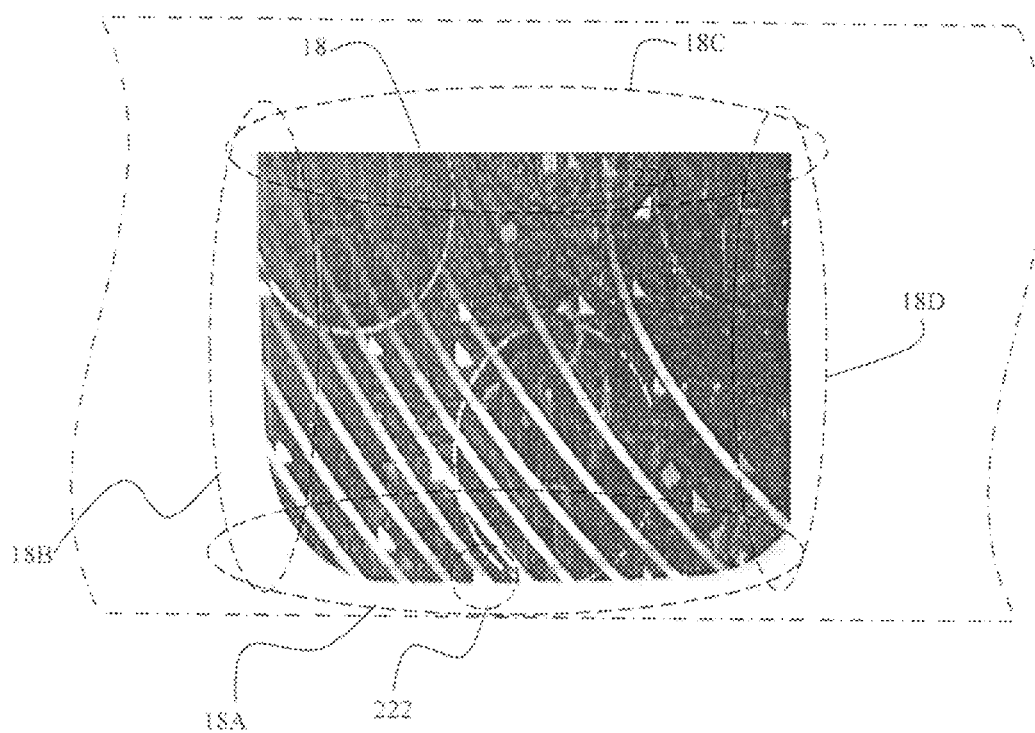
FIG. 4 is an image of a holographic pattern overlying a hologram.

FIG. 3B depicts another version of a pattern 22A overlying a security hologram 18. In FIG. 3B, pattern 22A is composed of parallel lines with non-uniform spacing therebetween extending at a preselected angle over fixed shape 18. The elements of pattern 22A cross over edge 18D at two points, P9 and P10 and define distances Y1, Y2, and Y3 which are unique to the resultant pattern. Elements of pattern 22A cross edge 18C at seven (7) intersecting points and define 9 different distances (X1-X9) which are unique to the resultant pattern. Similar observations and measurements can be made for regions 18A and 18B.

Figures 3C, 3D:
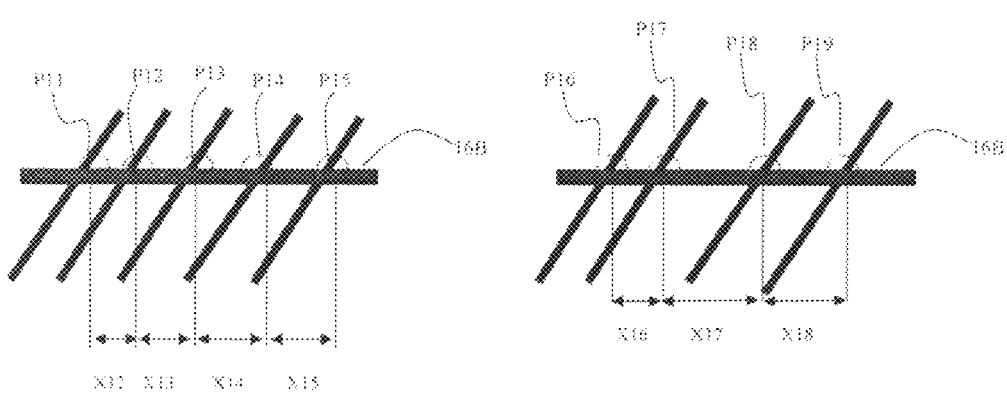
FIGS. 3C and 3D are top views of holographic patterns overlying fixed geometric pattern.

Similarly, data sets can be generated at any selected region of interest where the elements of pattern 22A pass over a line segment or shape with which there is a contrast. FIG. 3C depicts the elements of pattern 22A crossing a line 16A at points P11, P12, P13 and P14, where the line extends from XB to XE. The number of line crossings and the distances (e.g., X11, X12, X13, X14 and X15) between points will vary as a function of the shape and format of pattern 22A. Likewise FIG. 3D depicts the elements of pattern 22A crossing a line 16B within a region of interest. Note that any line segment (e.g., 16A, 16B) can be placed virtually anywhere on the card 10 and be defined as a region of interest and intersection point information can be generated as long as there is sufficient contrast to define the points of intersection. In accordance with the invention, data sets from numerous (one or more) regions of interest can be read and stored in the card's memory. The order in which the data sets are subsequently accessed can be programmed and/or data sets can be encrypted to enhance the degree of security.

FIG. 4 includes an actual image capture of a holographic pattern 22A superimposed over a security hologram 18. In FIG. 4 pattern 22A consists of curved lines with non-uniform spacing. Pattern 22A intersects with the four edges (18A-18D) of security hologram 18 at various points. These intersection points are different for each card and can be used to generate specific and varied data sets corresponding to the optical pattern, when the respective region(s) of interest is or are illuminated and scanned, as already discussed. The pattern 22A shown is by way of example only and pattern 22A can have any geometric shape. FIG. 4 also shows the presence of additional fixed holographic shapes (e.g., triangles 222) randomly formed within the layers.

FIG. 5 is a highly simplified cross sectional view of a card 10 with a holographic pattern 22A positioned within a reader 60. The card may be illuminated by source 64 so that light is incident on holographic pattern 22A (or on any region of interest) at an angle of alpha ($\alpha$) with respect to the surface 242. Light incident on the holographic pattern is reflected off the surface 242 at an angle beta ($\beta$). The surface of pattern 22A has microscopic angles which causes light incident at an angle alpha to be reflected at an angle beta. Therefore, by positioning a light sensor 64 at the preset angle, light incident on a holographic element 22A will be reflected at the proper predetermined angle and be read by light sensor 66. If there is no holographic element, light will not be reflected and read by light sensor 66.

Dynamic Encryption via Multi-Optical Scans

Once a card 10 is formed, a specially designed reader (e.g., 60 in FIG. 5), under the control of the entity manufacturing or distributing the card, can be used to sense the resultant optical pattern or portions thereof with the reader being programmed to process the information including encoding and encrypting the information with the capability to then write corresponding data in the card's integrated circuit chip 13 wirelessly via the antenna 15 or by any other suitable means. For all subsequent reads (i.e., uses) of the card 10 the data stored in the chip 13 may be used to determine the validity of newly read optical data and to determine the validity of the card.

As discussed, selected regions of interest (e.g., 18A-18D and 16A, 16B) can be scanned optically by a reader to produce data sets corresponding to the intersection points (resultant pattern) of the holographic pattern 22A with the fixed geometric line segments (edges) of the security Hologram or any other suitable line segment. The reader (e.g., 60) may be programmed to process the scanned data from multiple regions of interest and generate encryption keys for further processing the scanned data. That is, the reader may be programmed to select different regions of interest for optical scanning at different times and/or to sequence the order in which the regions of interest are scanned. Therefore, on each subsequent optical scan of the card it is possible to change the basis of the scan data obtained and/or the basis of the encryption key. It should be evident that the fixed geometric pattern may be made more complex (e.g., the security hologram may be octagonal rather than rectangular and a greater number of line segments, in the horizontal and/or vertical direction or even along a diagonal, can be used. Thus, it is possible to have n different dynamic patterns; where n is an integer significantly greater than one (1).

The overall encryption patterns is a convolution of a single optical pattern up to n optical patterns of which the selection of the number of optical security pattern may vary from one scan to the next. The level of security can be programmable. For example, the embodiment of this invention can be combined with an additional scan associated with the security hologram located on the base card and which may contain additional independent random optical patterns, which can be scanned independently and convoluted with one or more of the see-through optical patterns to form a complex security pattern. On a subsequent scan of the card the following may occur, in addition to scanning the patterns contained within the security hologram then the see-through hologram can be scanned along a different region of interest and the seed data for forming the encryption key has been changed. That information is written to the card and now the overall data structure and encryption format is different and dynamic from scan n to scan n+1.

Figure 6:
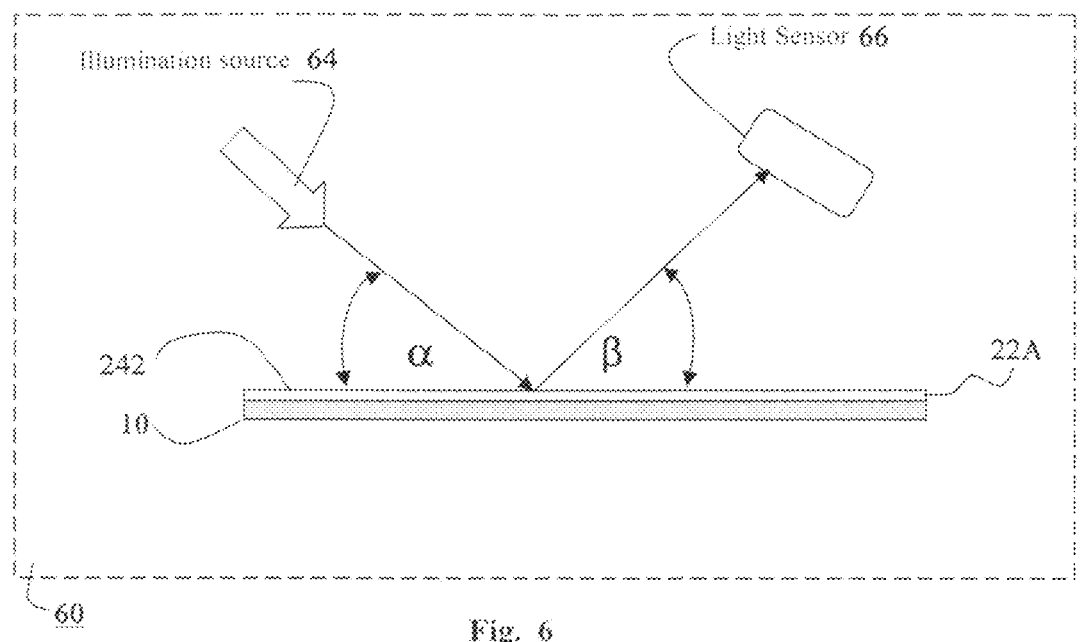
FIG. 6 is a cross section of a card with an illumination source and a sensor for reading information on the card's surface.

FIG. 6 is a highly simplified block diagram of the card reader 60 and part of a card reading system identifying some of the functions and components used to practice the invention, with a card 10 symbolically inserted in the reader. The system includes:

(A) A control microprocessor 62, (with unique serial identification number) used to perform various programming functions and which includes circuitry for processing and storing data;

(B) An illumination control module for the illumination source 64 which includes a plurality of controllable light sources which can be controlled to illuminate desired regions of interest on the card 10 inserted into the reader;

(C) An image sensor 66, identified, by way of example, as a 2D area sensor, to sense light signals reflected from an inserted card to ascertain optical features (including the security features) on the card. The sensor 66 is coupled to processor 62 and provides to it optically sensed signals which may then be processed (and store) in the processor 62.

(D) An RFID reader/writer module 68 to communicate with the card's data processing circuitry, as is generally known in the art. Module 68 can be used by the reader 60 to: (a) read selected data present on or in the card's programmable storage circuitry and feed it to its processor 62 for processing in any pre-selected manner' (b) to send selected data which will be written into and stored in a predetermined programmed manner in the card's storage circuitry.

(E) an ambient light detector 70 to increase security of the system by shutting down the unit if the unit is opened up or reverse engineered in an unauthorized manner;

(F) an internal global positioning system ("GPS") 72 to increase security of the system for shutting down the reading unit 60, if the unit is moved to an unauthorized location;

(G) a biometric detector 74, such as a fingerprint or iris scanner, to read and match biometric data as needed;

(H) a non-changeable RFID identification tag 76 to be used for inventory purposes or to bind a system to a particular processor or other purposes;

(I) a card insertion detector 78 to determine the proper insertion of a card; and (J) a USB interface 80 to connect the system to databases or other informational sources.

Note that the features of a secure card reading system illustrated in FIG. 5 are representative examples of only one embodiment of the invention. Other embodiments may include only some of the features listed above or may include additional features not listed.

Figure 7:
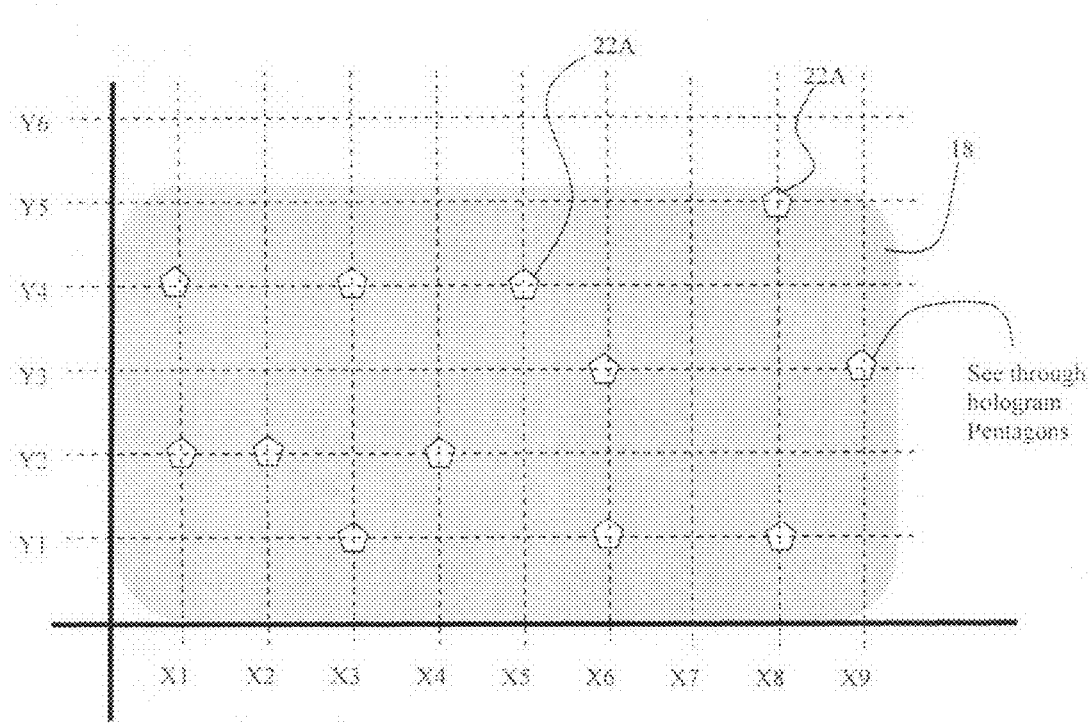
FIG. 7 is a top view of part of a card on which geometric shapes have been formed randomly.

FIG. 7 is an embodiment of the invention in which the elements of holographic pattern 22A are regular geometric shapes (e.g., pentagons), rather than lines, distributed over an underlying fixed geometric pattern (e.g., the security hologram 18). As already noted, the elements of pattern 22A can be any regular or non regular geometric shapes and can include various (different) vertical and horizontal distances between the elements and various card edges. These can be optically sensed, recorded and processed.

Figure 8:
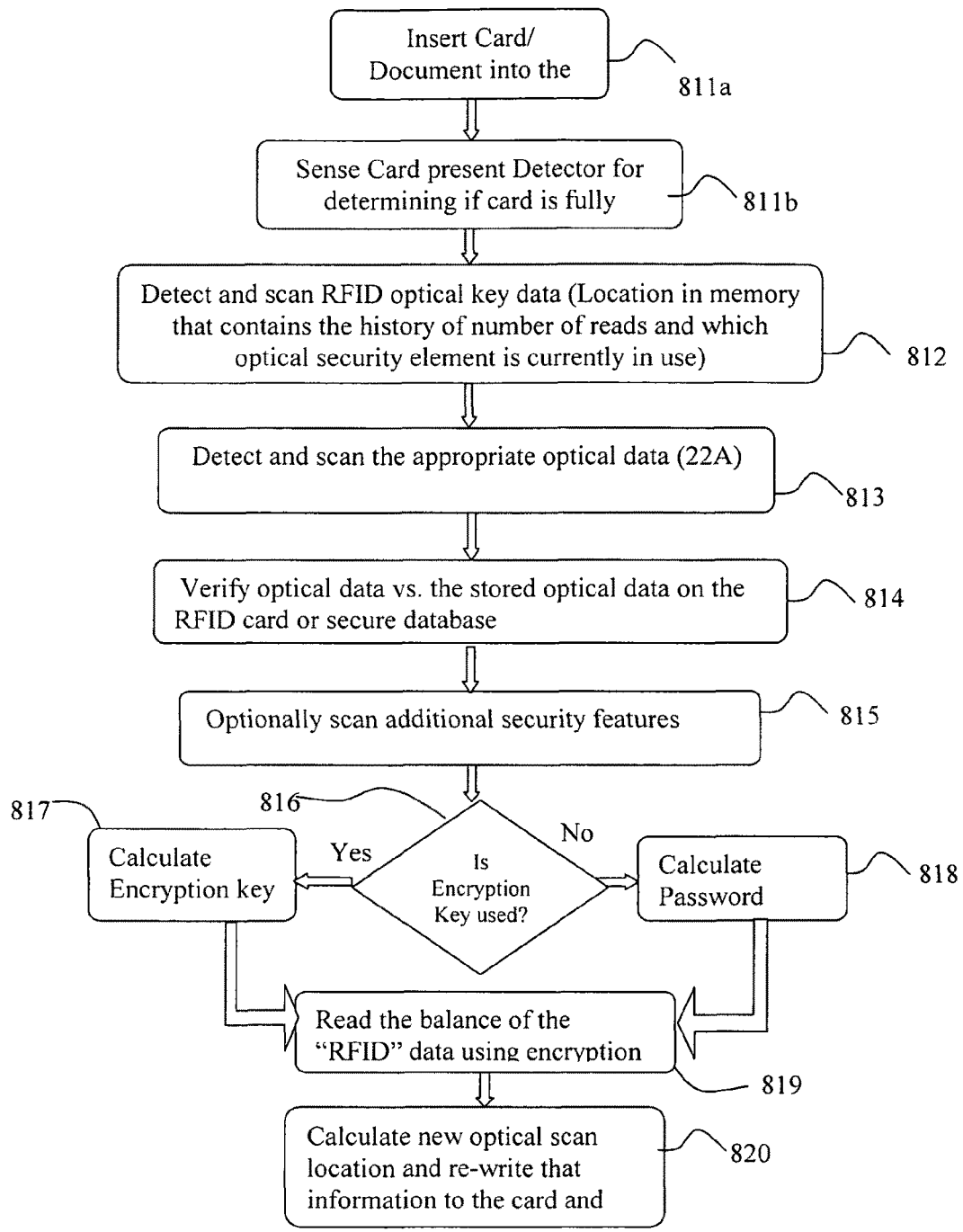
FIG. 8 is a flow chart illustrating the dynamic operation of a card system embodying the invention.
Figure 9C:
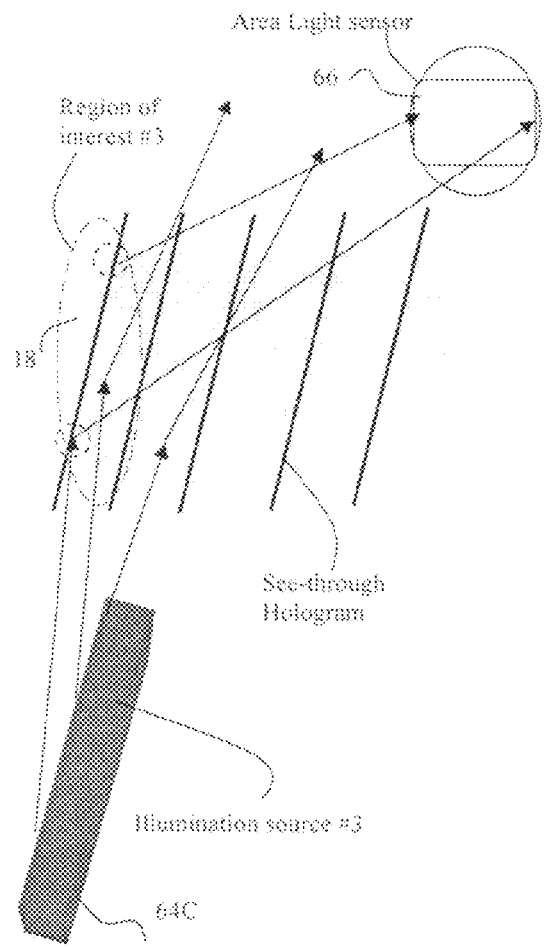
Figure 9D:
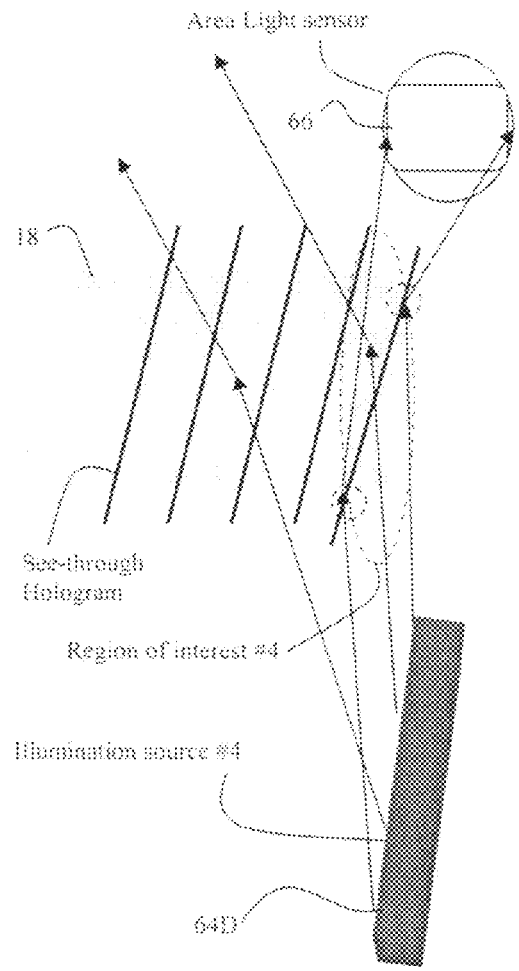

FIG. 8 is a flow diagram illustrating processing steps which a reader may be programmed to conduct to read a card 10 and enable security features. A first step 811a calls for the card to be inserted into the card reader. The card must be properly inserted, and towards that end a detector in the reader can determine if the card is properly inserted (step 811a and 811b). If yes, the reader will proceed to scan and process the optical data (steps 812, 813). The reader is programmed to verify the sensed optical data versus the stored optical data in the RFID chip 13 or present in a secure data base to validate the card (step 814). The reader may also be designed to include other security checks, as noted above (step 815). The reader may also be programmed to calculate an encryption key and/or a password (steps 816, 817, 818). The reader may then be programmed to read the balance of the RFID stored data using the encryption key and/or the password (step 819). Full use of the card for its intended purpose is then permitted. Thereafter, the reader, in accordance with the invention, may be used to calculate the optical information sequence to be looked at the next time the card is read and to rewrite that information into the card's memory chip and to also track that the card has been read and store that information (step 820).

FIGS. 9A, 9B, 9C, and 9D show the positioning of different light sources (e.g., 64a, b, c, d,) contained within a reader 60 for illuminating different regions of interest on a card 10. An area sensor 66 is used to sense optical data reflected from various intersection points due to elements of "random" holographic pattern 22A overlying a fixed geometric pattern at selected regions of interest.

The reader 60 may be programmed to select which regions of interest are illuminated and the angle of illumination. Light reflected, at a corresponding angle, from the elements of the holographic pattern 22A present in the region of interest will be captured by the sensor 66. Light is reflected at certain angles of the pattern 22A due to the holographic nature of the pattern 22A. Light reflected at a specific angle will be sensed by light sensor 66. On the other hand, light that is not reflected at a specific angle will not be read by light sensor 66.

Figure 10:
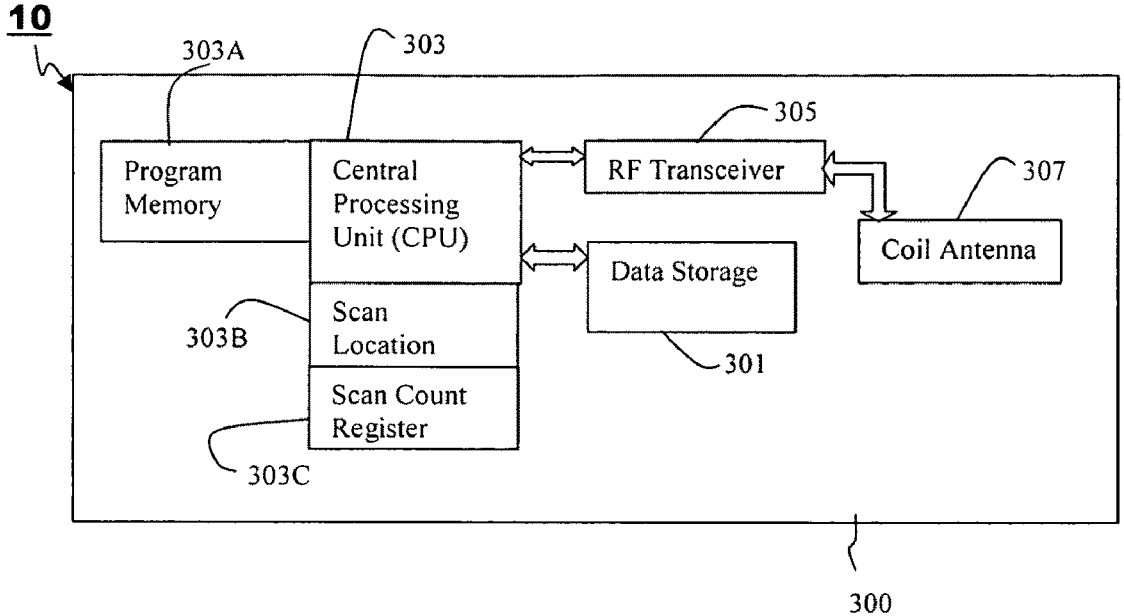
FIG. 10 is a side view of a card with programmable data storage and processing elements.
Figure 11:
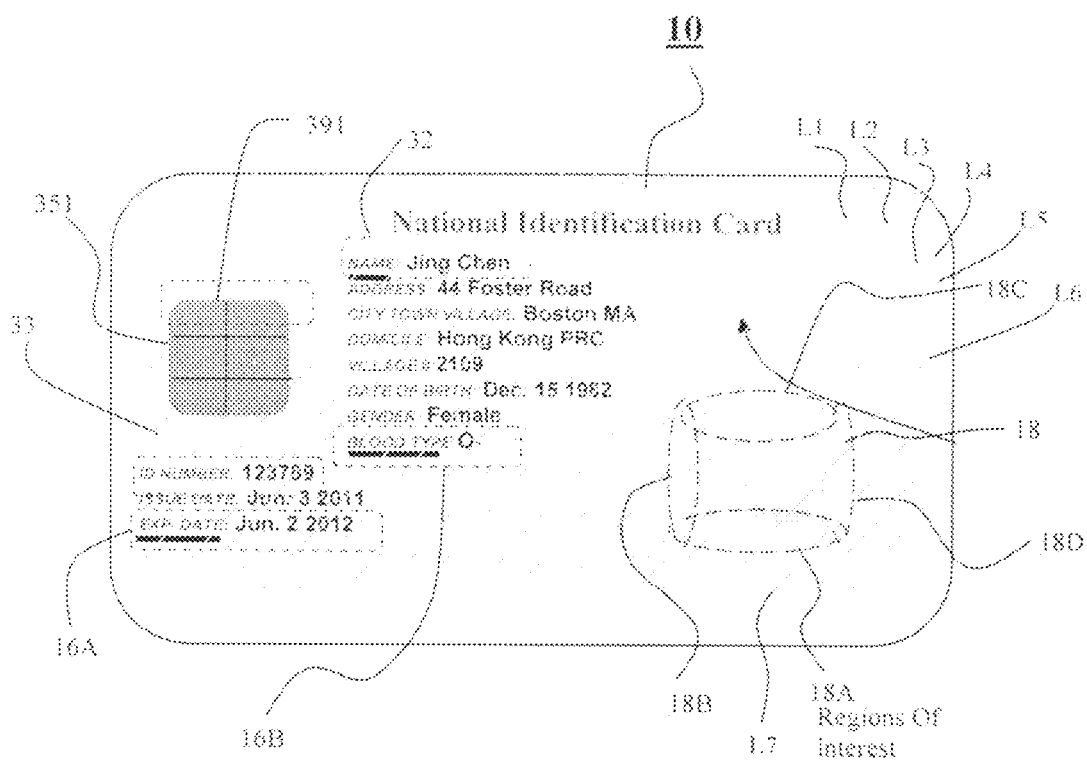
FIG. 11 is a top view of a card embodying the invention using an integrated circuit (IC) contact module for information processing.

FIG. 10 is intended to detail some of the electronic components of a card 10 embodying the invention. The electronic components include (but are not limited to) a programmable data storage and processing circuit 300 which corresponds to RFID chip 13. The circuit 300 includes: a data storage element 301; a data processor (CPU) 303 which may include scan location registers 303B and scan count registers 303C; a transceiver 305; and an antenna 307. The transceiver 305 may be included as part of the antenna 307 and the data processor 303. The card 10 can communicate (be read from or written into) with an associated reader 60 via RF transmission (antenna 307) or any suitable electromagnetic system.

Data storage circuitry 301 may be used to store fixed (physical) information as well as any other information. In circuits embodying the invention there is provided a processor/programmer circuit 303 which can be used to control the processing of the data in circuit 301. For example, the processor/programmer 303 can be used to track variable information. Examples of such variable information include the number of times the card has been read. The significance of this feature is that it enables the dynamic operation of the card 10 with increased and enhanced security. By way of example of the operation the card 10 can be part of a card/reader system which can function as described below.

The reader system 500 includes, by way of example, optical illumination sources which can illuminate the card producing a data set corresponding to physical attributes of the card 10. One mode of operation is for the reader to sense the insertion of a card including the circuit 300 and for the reader to include means for interrogating the card and for the card via programming circuit 303 to inform the reader of the optical information which it should seek. The reader can then proceed to compare the information that it scans or reads with the stored information from circuit 300. Assuming that the information matches the reader can validate the card 10 and or any operation depending thereof.

Thereafter, the reader can provide a signal to the circuit 300 that the card 10 has been read. Depending on the programming of processor 303 if there is a read counter it can be updated to a higher count and/or other coding of the information of the sequencing of the information.

Referring to the figures various aspects of the invention may be described as follows:

1—A card 10 may be formed having certain physical characteristics including a "random" geometry holographic pattern overlying a fixed geometry pattern to produce a resultant pattern which varies from card to card. It is the intention of the card manufacturer that each card will be different than any other card. The card may also have multiple regions of interest, defined as regions where the "random" pattern crosses over selected line segments or selected elements of the fixed geometry pattern.

2—The card 10 may be formed by combining two sub assemblies (19 and 21). Each subassembly may be formed to contain certain of the desired components with the combination providing a very efficient manufacturing process for making a card with desired, enhanced, security characteristics.

3—The card 10 may include an RFID chip 13 (or any equivalent electronic or electromagnetic system) which can store information, which can be programmed and into which information can be written and from which information can be selectively read.

4—In so far as the use of the card 10, the security aspects include:

i—First use of the card 10 following its manufacture. The card 10 is inserted into (mated with) an associated reader (e.g., 60) which is programmed to optically sense (read) multiple selected regions of interest which include the holographic pattern 22A and process the data corresponding to the optical sensing. The reader can also sense other "fixed" information located on the card and process the information. Selected information pertaining to the card processed by the reader is then written into the RFID chip 13 of card 10 and stored therein.

ii—Subsequently, the card 10 can be used for its intended purpose after it is inserted into an associated reader (e.g., 60 or any one like 60) and the reader indicates that the card is valid. The reader is programmed to indicate that the card is valid after doing at least the following: (a) optically sensing selected regions of interest which include the holographic pattern 22A performing, processing the data; (b) electromagnetically reading the data stored in the RFID chip corresponding to the selected regions of interest; (c) comparing the optically sensed data with the data retrieved from the RFID chip; and (d) generating a signal indicative of the validity of the card 10, if criteria for its validity are met. Thereafter the card may be used for its intended purpose.

iii—In accordance with the "dynamic" aspect of the invention, the reader (and/or the card) may be programmed to sense different regions of interest and other fixed data, on the subsequent and other read cycles of the card, and process the information in accordance with a programmed order. Thus, for each read cycle or for each subsequent read cycle, the order or sequence in which the information is compared may be changed as well as which information is to be considered. By way of example, the optical patterns associated with scan n of the card's security Hologram and scan n of the see-through Hologram located at the region of interest #1 are then convolved to form a single set of security encryption keys which may then be used to seed the encrypt engine that is used to protect the personalization data that is being stored in the RFID portion of the instrument. On subsequent scans (n+1) of the instrument the region of interest may be switched to region #2 in which case the encryption keys which is derived from the optical scans will now be a different value. This cycle is repeated on each subsequent scan thereby yielding a dynamic encryption key generation methodology.

iv—In addition to the above, it is noted that the card may, for example, include a register for counting each time the card is read or used. This could prove to be very useful where the card is a passport. The number of uses could be automatically tracked. Additional to the above example we could also keep count of the number of times the cards has been scanned and use that varying parameter in the encryption key calculation.

It should be noted that the invention has been illustrated using an RFID chip. However, it should be appreciated that the invention may be practiced with a contact card where information stored in a card's microprocessor is read from the card via one or more contacts and information may be written into the card's microprocessor via contacts.

What is claimed is:

1. An instrument with increased security features comprising:
    a substrate;
    an intermediate layer overlying said substrate; said intermediate layer including a first pattern which includes a fixed geometric pattern; a patterned layer, overlying said intermediate layer, in which is formed a second pattern which includes a holographic geometric pattern, said holographic geometric pattern formed independently of said fixed geometric pattern whereby the combination of the first and second patterns forms a resultant random pattern; wherein the holographic geometric pattern overlies the fixed geometric pattern and wherein the cross over points of said holographic geometric pattern with a selected part of said fixed geometric pattern defines a set of data points; and wherein said data points can be sensed and stored.

2. An instrument with increased security features as claimed in claim 1, wherein the combination of the first and second patterns forms a resultant random pattern which can only be read when illuminated at a predetermined angle and read at a corresponding angle.

3. An instrument as claimed in claim 2, wherein said instrument includes means for storing the data.

4. An instrument as claimed in claim 3, wherein said instrument includes means for receiving data, storing the data and for transmitting the stored data.

5. An instrument as claimed in claim 4 wherein said means for receiving data, storing the data and for transmitting the stored data includes storage means and an antenna positioned within said intermediate layer.

6. An instrument as claimed in claim 2, wherein said fixed geometric pattern includes at least one of a security hologram, personal data and selected identifying information.

7. An instrument as claimed in claim 2, wherein said data is stored in a data base external to said instrument.

8. An instrument as claimed in claim 1, wherein said fixed geometric pattern includes a number of predetermined different regions underlying the holographic geometric pattern and wherein the cross over points of the holographic pattern with selected ones of the predetermined different regions may be used to generate different sets of data points; and wherein said data points can be read and stored.

9. An instrument as claimed in claim 8, wherein said instrument includes means for receiving data, storing the data and for transmitting the stored data and wherein said means is programmed to provide dynamic encrypting capability to enhance the security of the instrument.

10. An instrument as claimed in claim 1, wherein said intermediate layer includes a first intermediate layer for positioning a read-write storage means and an antenna for RF communication and a second intermediate layer for positioning at least one of a selected security hologram, reference patterns and personal identification information; and wherein said holographic geometric pattern is formed within a layer which overlies said intermediate layer and further including a protective layer overlying the holographic geometric layer.

11. An instrument as claimed in claim 1, wherein a clear protective layer overlies said patterned layer which includes said holographic geometric pattern.

12. An instrument as claimed in claim 1, wherein said instrument includes an integrated circuit (IC) and means for enabling the integrated to be conductively accessed.

13. A method of forming an instrument with enhanced security features comprising:
    forming a first subassembly including (a) a substrate having inner and outer surfaces; and (b) an intermediate layer overlying the inner surface of said substrate; said intermediate layer including a fixed geometric pattern;
    forming a second subassembly including a protective layer having an outer surface and an inner surface and forming a holographic pattern on the inner surface of said protective layer, said holographic pattern being formed independently of said fixed geometric pattern and without reference thereto; and
    combining the first and second sub-assemblies such that: (a) the outer surface of the protective layer defines one outer, external, surface of the instrument and the outer surface of the substrate defines an opposite outer, external, surface with the holographic geometric pattern layer overlying the fixed geometric pattern layer; and (b) the resultant pattern produced by the combination of the holographic pattern and the fixed geometric pattern is a random pattern.

14. A method as claimed in claim 13 wherein said intermediate layer includes means for receiving, storing and transmitting information; and wherein said method includes the step of storing information pertaining to selected properties of the random pattern.

15. A method as claimed in claim 14, including the step of designating a plurality of locations of the patterns as regions of interest and including the step of storing corresponding information thereto in the instrument.

16. A method as claimed in claim 14 wherein means for receiving, storing and transmitting information includes deriving an encryption key for processing optical data obtained from scanning selected portions of the random pattern.

17. A method as claimed in claim 14 including means for scanning one or more of the different regions of the random pattern and for selectively changing the sequencing of the scanning of the different regions.

18. A method as claimed in claim 13 wherein said intermediate layer includes means for receiving, storing and transmitting information including means for recording each time the instrument is read.

19. A method as claimed in claim 13, wherein the means for receiving, storing and transmitting information includes data processing means, read-write storage means and an antenna.

20. A method for forming an instrument with increased security features comprising:
   forming the instrument with multiple layers, the topmost layer being a clear protective layer; a see-thru holographic pattern randomly formed on the underside of the topmost layer which overlies a layer including fixed information and a well defined hologram;
   sensing the pattern formed by the intersection of the random see-thru holographic pattern with selected regions of the instrument, where the selected regions including at least one of the well defined hologram and the predetermined information; and
   storing the information corresponding to the sensed pattern for subsequently sensing the pattern formed by the intersection of the random see-thru holographic pattern with selected regions of the instrument and comparing it to the stored information for validating the instrument.

21. The method as claimed in claim 20, wherein sensing the pattern formed by the intersection of the random see-thru holographic pattern with selected regions of the instrument includes sensing the pattern at more than one selected region of the well defined hologram.

22. The method as claimed in claim 21, wherein the instrument includes an RFID chip and storing the information includes storing the sensed pattern in the RFID chip.

23. The method as claimed in claim 22, wherein the RFID chip is programmed to count the times the instrument has been sensed and which portion of the stored information is used to compare and validate subsequent sensings of the instrument.

\* \* \* \* \*